(12) United States Patent
Shephard (10) Patent No.: US 6,239,378 B1
(45) Date of Patent: May 29, 2001

(54) FLAME RESISTANT SILICONE RUBBER WIRE AND CABLE COATING COMPOSITION

(75) Inventor: Kiersten Lynn Shephard, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 09/241,474

(22) Filed: Feb. 2, 1999

(51) Int. Cl.$^7$ .................................................. C08K 7/10
(52) U.S. Cl. ................... 174/110 S; 524/785; 524/788; 524/860; 524/861; 524/862; 524/456; 525/477; 525/478; 528/24; 528/32
(58) Field of Search ..................... 524/456, 860, 524/861, 785, 862, 788; 525/477, 478; 528/12, 32, 24

(56) References Cited

U.S. PATENT DOCUMENTS

| | | | |
|---|---|---|---|
| 3,355,532 | 11/1967 | Bracht et al. | 264/234 |
| 3,817,910 | 6/1974 | Viksne et al. | 260/37 |
| 5,098,769 | * 3/1992 | Nakai et al. | 428/195 |
| 5,306,739 | 4/1994 | Lucey | 522/42 |
| 5,972,512 | * 10/1999 | Boisvert et al. | 428/409 |
| 6,084,002 | * 7/2000 | Nicholson et al. | 521/91 |

FOREIGN PATENT DOCUMENTS

| | | |
|---|---|---|
| 3439745 | 10/1984 | (DE) . |
| 739947 | 10/1996 | (EP) . |
| 902440 | 3/1999 | (EP) . |
| 9-55125 | 2/1997 | (JP) . |
| WO 95/322245 | 11/1995 | (WO) . |

OTHER PUBLICATIONS

Hirshler, "Analysis of and Potential Correlations Between Fire Tests for Electrical Cables, and How to Use This Information for Fire Hazard Assessment", Fire Technology, vol. 33, No. 4 (1977).

Fu–Yu Hshieh and Robert R. Buch, "Controlled–atmosphere Cone Calorimeter, Intermediate–scale Calorimeter, and Cone Corrosimeter Studies of Silicones", Proc. Int. Conf. Fire Safety, vol. 23, p213–239 (1997).

UL 910 Standard Test for Flame–Propagation and Smoke–Density Values for Electrical and Optical–Fiber Cables Used in Spaces Transporting Environmental Air, 4th Ed., May 2, 1995.

Hirshler, "Comparison of Large–and Small–scale Heat Release Tests with Electrical Cables," Fire and Materials, vol. 18, 61–87 (1994).

\* cited by examiner

Primary Examiner—Robert Dawson
Assistant Examiner—Marc S. Zimmer
(74) Attorney, Agent, or Firm—Jennifer S. Warren (57) ABSTRACT

A curable silicone wire and cable coating composition with improved flame resistance at heat flux rates of 50 to 90 kW/m$^2$, made by mixing ingredients comprises:

(A) 30 to 90 weight percent of a heat-curable non-halogenated organosiloxane polymer, containing at least 2 alkenyl groups per molecule, (B) 1 to 65 weight percent of a reinforcing silica filler, based on the total composition, (C) 5 to 70 weight percent wollastonite having an average particle size of 2 to 30 μm, based on the total composition, and (D) curing component sufficient to cure the composition.

18 Claims, 6 Drawing Sheets

Figure 1. The HRR as a Function of Time for Model Elastomers.

Figure 2. The HRR as a Function of Time for LSR Cabling Materials.

Figure 3. The HRR as a Function of Time for HCR Cabling Materials.

Figure 4. The HRR as a Function of Time for High Consistency Silicone Rubber.

Figure 5. The HRR as a Function of Time for High Consistency Silicone Rubber.

Figure 6. The HRR as a Function of Time for Model Elastomers.

FLAME RESISTANT SILICONE RUBBER WIRE AND CABLE COATING COMPOSITION

This invention relates to curable silicone rubber compositions with improved flame resistance. More specifically, this invention relates to silicone rubber for use as insulation and jacketing materials for transmission media plenum cable. The resulting transmission media plenum cables exhibit low flame spread and low smoke generation properties acceptable by industry standards. In addition, because these compositions do not contain halogens, their combustion by-products are expected to be less toxic and corrosive.

BACKGROUND OF THE INVENTION

In the construction of many buildings, a drop ceiling is spaced below a structural floor panel that is constructed of concrete, for example. Light fixtures as well as other items appear below the drop ceiling The space between the ceiling and the structural floor from which it is suspended serves as a return-air plenum for elements of heating and cooling systems, as well as a convenient location for the installation of communication cables including data and signal cables for use in telephone, computer, control, alarm, and related systems. It is not uncommon for these plenums to be continuous throughout the length and width of each floor. Also, the space under a raised floor in a computer room is considered a plenum if it is connected to a duct or to a plenum.

As a general rule, the National Electrical Code (NEC) requires that cables in plenums be enclosed in metal conduits. However, the NEC permits certain exception to this requirement provided that such cables are tested and approved by an independent testing agent such as the Underwriters Laboratories (UL) as having suitably low flame spread and smoke-producing characteristics.

The flame spread and smoke production of cable are measured using UL 910, Standard Test Method for Fire and Smoke characteristics of Electrical and Optical-Fiber Cables used in Air-Handling Spaces. The UL 910 test, also known as the NFPA 262 test, is considered to be the toughest performance test. Hirshler, in "Analysis of and Potential Correlations Between Fire Tests for Electrical Cables, and How to Use This Information for Fire Hazard Assessment", *Fire Technology*, Vol. 33, No. 4 (1977) describes various tests used on electrical cables to assess fire hazard, and is hereby incorporated by reference for testing information.

The Steiner tunnel test is quite severe, because it combines a high heat flux with a long duration. Currently, thermoplastic materials such as highly filled polyvinyl chloride (PVC) and fluoropolymers, such as FEP, pass the Steiner tunnel test. However, fluoropolymer materials are somewhat difficult to process. Also, some of the fluorine-containing materials have relatively high dielectric constant which makes them unattractive for communication media.

Further, PVC and fluoropolymers such as FEP are halogenated material. There has been a desire to overcome some problems which exist with respect to the use of halogenated materials such as fluoropolymers and polyvinyl chloride (PVC). These materials exhibit undesired levels of corrosion in fires. If a fluoropolymer is used, hydrogen fluoride forms under the influence of heat, causing corrosion. For PVC, hydrogen chloride is formed.

Silicones, especially non-halogenated polydimethylsiloxanes, are known for fire and heat resistance. Silicones burned in a cone calorimeter have been shown to have a comparatively low peak heat release rate, total heat released, average carbon monoxide production rate, and average smoke production rate as compared with organic compound. See, for example Fu-Yu Hshieh and Robert R. Buch, "Controlled-atmosphere Cone Calorimeter, Intermediate-scale Calorimeter, and Cone Corrosimeter Studies of Silicones, *Proc. Int. Conf Fire Safety*, Vol. 23, p213–239 (1997). Silicone rubber compositions as jacketing for wire and cable applications are also known, and are generally less expensive than fluoropolymers. However silicone rubber formulations have not previously passed the UL 910 test, and are not currently qualified for plenum use. Silicones are not, for instance, currently listed in the UL 1581 specification for cabling materials. This is believed to be due, in part to poor char formation upon exposure to high heat flux rates. The surface of many silicone rubber compositions used for cable coating crumbles when burned, exposing unburned polymer and substrate, allowing the flame to propagate. Because of these characteristics, no silicones are currently qualified for use in coating plenum cable. The ability to use a non-halogenated polydimethylsiloxane composition as a plenum cable coating would offer a less expensive, non-corrosive material than fluoropolymers.

Recently Sawada, in Japanese patent application 9-55125 described a fireproof electric cable having excellent fire resistance. A fireproof layer of 0.1–1.0 mm in thickness is formed by extruding a coating composition that is 200–500 weight parts of four inorganic fillers to 100 weight parts of hot-vulcanized silicone rubber. The four fillers are glass powder, alumina, wollastonite, and mica. Sawada teaches that all four fillers must be present for sufficient fire resistance. The silicone rubber used by Sawada is hot-vulcanized, and may also contain a crosslinking agent consisting of an organic peroxide, but no information on the chemistry of the silicone is specified. The glass powder consists of particles having a diameter of 50–300 $\mu$m and the glass content is 50 to 125 wet parts per 100 weight parts of hot-vulcanized silicone rubber. The alumina which is used consists of particles having a diameter of 50–200 $\mu$m, and the content of the alumina is within a range of from 50 to 125 weight parts per 100 weight parts of hot-vulcanized silicone rubber. Wollastonite is used in the form of needle crystals of anhydrous calcium silicate having a particle size of 100–300 $\mu$m. The content of the wollastonite is 50 to 125 weight parts per 100 weight parts of the hot-vulcanized silicone rubber. Mica is preferably in the form of flakes with an aspect ratio of about 30–70 ad a particle size of 100–300 $\mu$m. The content of mica is 50–125 weight parts per 100 weight parts of the hot-vulcanized silicone rubber. The wire coating of Sawada was tested according to the Fire Services and Fire Resistance Test Act. The test was conducted following a flame curve with a temperature of 840° C. during a 30 min burning process

SUMMARY OF THE INVENTION

The invention is a curable silicone rubber composition with improved flame resistance at heat flux rates of 50 to 90 kW. More specifically, the invention is a silicone rubber wire and cable coating composition capable of passing the UL 910 test when coated onto transmission cable media. The inventor has discovered that certain curable silicone rubber compositions containing 5 to 70 weight percent wollastonite having an aspect ratio of at least 3 to 1, and having an average particle size of 2 to 25 $\mu$m have surprisingly good fire resistance and form hard chars on burning. The coating composition is suitable for a jacketing flame resistant layer on cable, wire, or fiber used in plenum construction.

DETAILED DESCRIPTION OF THE INVENTION

This invention is a curable silicone wire and cable coating composition with improved flame resistance at heat flux rates of 50 to 90 kW/m$^2$, made by mixing ingredients comprising:
(A) 30 to 90 weight percent of a heat-curable nonhalogenated organosiloxane polymer, containing at least 2 alkenyl groups per molecule,
(B) 1 to 65 weight percent of a reinforcing silica filler, based on the total composition,
(C) 5 to 70 weight percent wollastonite having an average particle size of 2 to 30 $\mu$m, based on the total composition, and
(D) curing component sufficient to cure the composition.

This invention also includes a transmission media plenum cable which comprises a silicone rubber coating formed by coating and curing the above composition.

Component A, the organosiloxane polymer has the average composition of $R_aSiO_{(4-a)/2}$. In the formula R is selected from substituted and unsubstituted monovalent hydrocarbon groups and is exemplified by alkyl groups such as methyl, ethyl, and propyl; alkenyl groups such as vinyl, allyl, butenyl, and hexenyl; aryl groups such as phenyl; and aralkyls such as 2-phenylethyl. The subscript a is a value from 1.95 to 2.05.

The organosiloxane polymer has at least 2 silicon-bonded alkenyl groups in each molecule. The alkenyl groups can be bonded in pendant positions, at the terminal positions, or at both positions. The molecular structure of the organosiloxane polymer generally has a degree of polymerization (dp) in the range of from 200 to 20,000. This dp range includes polymers which are thick, flowable liquids as well as those that have a stiff, gum-like consistency. Typically, silicone rubber compositions used in wire and cable applications usually use polymers with a stiff, gum-like consistency to process more readily used in screw-type extruders. Generally, these stiff gum-like polymers have a dp above about 1500 and have a Williams plasticity number (ASTM D926) in the range of from about 30 to 250, and preferably from 95 to 125. The plasticity number, as used herein, is defined as the thickness in millimeters×100 of a cylindrical test specimen 2 cubic cm in volume and approximately 10 mm in height after the specimen has been subjected to a compressive load of 49 Newtons for three minutes at 25° C. More recently, silicone rubber made from polymers that are thick flowable liquids have been found to be useful as wire and cable materials. These materials can typically be pumped through a die to coat wire or cable without the use of a screw-type extruder. Because less stress is needed to process these materials, they may be more suitable for coating glass or polymer fiber cables. The polymers that are thick flowable liquids have a dp below about 1500 and have a viscosity of between about 200 to 100,000 mPa·s at 25 ° C.

The organosiloxane polymer can be a homopolymer or a copolymer or a mixture of such polymers. The siloxy units comprising the organosiloxane polymer are exemplified by dimethylsiloxy, vinylmethylsiloxy, and methylphenylsiloxy. The molecular terminal groups in the organosiloxane polymer are exemplified by trimethylsiloxy, and vinyldimethylsiloxy groups. The organosiloxane polymer is exemplified by vinyldimethylsiloxy-endblocked dimethylsiloxane-vinylmethylsiloxane copolymer, vinyldimethylsiloxy-endblocked polydimethylsiloxane, vinylmethylhydroxysiloxy-endblocked dimethylsiloxane-vinylmethylsiloxane copolymer, and vinyldimethylsiloxy-endblocked dimethylsiloxane-methylphenylsiloxane-vinylmethylsiloxane copolymer Component B is a reinforcing silica filler, to provide increased mechanical properties in the present heat cured silicone rubber composition. The filler can be any silica filler, treated or untreated, which is known to reinforce polydiorganosiloxane and is preferably selected from finely divided, fumed and precipitated forms of silica and silica aerogels having a specific surface area of at least about 50 m$^2$/g, and preferably 150 to 400 m$^2$/g. The filler is typically added at a level of about 1 to 65 weight percent of the weight of the total composition, and preferably in a range of 5 to 25 weight percent of the total composition.

It is preferred to treat the reinforcing silica filler to render its surface hydrophobic, as typically practiced in the silicone rubber art. This can be accomplished by reacting the reinforcing silica filler with a liquid organosilicon compound which contains silanol groups or hydrolyzable precursors of silanol groups. Compounds that can be used as filler treating agents, also referred to as anti-creping agents or plasticizers in the silicone rubber art, include such ingredients as low molecular weight liquid hydroxy- or alkoxy-terminated polydiorganosiloxanes, including α,ω-silanediols, hexaorganodisiloxanes, cyclodimethylsiloxanes and hexaorganodisilazanes.

Component (C) is 5 to 70 weight percent of wollastonite having an average particle size of 2 to 30 μm. Wollastonite, also known as calcium metasilicate, is a naturally occurring mineral. The wollastonite used in this invention is a mined form, having an acicular morphology, that is a needle-like shape. Typically, this mineral has an aspect ratio (length-to-diameter) of 3:1 or greater. It is preferred that the wollastonite have an average particle size of from about 5 to 15 μm and an aspect ratio greater than about 15:1. The wollastonite used in this invention has a low BET surface area, typically less than 25 $m^2/g$, and preferably less than 5 $m^2/g$. Compositions using calcium silicates of other shapes and morphologies than wollastonite do not exhibit the char formation or low heat release rates of those of the present invention. For example, a composition made with synthetic calcium, which typically has a spherical shape, is shown in the examples below not to have the desired fire performance. A preferred wollastonite is supplied by NYCO® Minerals, Inc., Willsboro N.Y. Compositions with less than about 5 weight percent wollastonite do not exhibit the char formation and low heat release rate of the present invention. The upper limit of wollastonite that is useful will depend on the properties desired in the uncured and cured composition. Generally, wollastonite present at greater than about 70 percent by weight results in uncured compositions that are too stiff and therefore difficult to process, and results in cured compositions that have reduced tensile strength and elongation.

The curing component (D) can be any of the well-known curing components known in the silicone elastomer art. For example, the curable silicone elastomer compositions of this invention may be cured to the elastomeric state by exposure to electron beams, ultraviolet rays, electromagnetic waves, or heat. Where heat is used as the curing mechanism, an organic peroxide curing agent may be used. Examples of suitable organic peroxide curing agents include 2,5-dimethyl-2,5-di (tert-butylperoxy)hexane,2,2-bis(t-butylperoxy)-p-diisopropylbenzene, 1,1,bis(t-butylperoxy)-3,3,5-trimethylcyclohexane, 2,5-dimethyl-2,5-di(tert-butylperoxy)hexyne-3,di-t-butylperoxide, benzoyl peroxide, p-chlorobenzoyl peroxide, dicumyl peroxide, tertiary butyl peracetate, tertiary butyl perbenzoate, monochlorobenzoyl peroxide, 2,4-dichlorobenzoyl peroxide, and tertiary butyl cumyl peroxide. The amount of catalyst used will depend on the type of catalyst and can be determined by experimentation. Generally, peroxide catalysts are useful in amount from about 0.05 to 10 parts, and more preferably 0.1 to 5 parts by weight catalyst per 100 parts by weight ingredient (A).

Another heat curing system which is applicable is one in which the curable silicone elastomer composition is cured by crosslinking the polyorganosiloxane with an organohydrogensiloxane crosslinker in the presence of a platinum group metal-containing catalyst. The organohydrogensiloxane crosslinker can contain an average of at least two silicon-bonded hydrogen atoms per molecule, and no more than one silicon-bonded hydrogen atom per silicon atom, the remaining valences of the silicon atoms being satisfied by divalent oxygen atoms or by monovalent hydrocarbon radicals comprising one to seven carbon atoms. The monovalent hydrocarbon radicals can be, for examples, alkyls such as methyl, ethyl, propyl, tertiary butyl, and hexyl; cylcoalkyls such as cyclohexyl; and aryls such as phenyl and tolyl. Such materials are well known in the art. The molecular structure of the organohydrogensiloxane may be linear, linear including branching, cyclic, or network-form. There are no particular restrictions on the molecular weight of the organohydrogensiloxane, however it is preferable that the viscosity at 25° C. be 3 to 10,000 mPa·s. Furthermore, the amount of component (D) that is added to the composition is an amount such that the ratio of the number of moles of hydrogen atoms bonded to silicon atoms to the number of moles of alkenyl groups bonded to silicon atoms is in the range of 0.5:1 to 20:1, and preferably in the range of 1:1 to 5:1. If this molar ratio is less than 0.5, curing of the present composition becomes insufficient, while if this molar ratio exceeds 20 hydrogen gas is evolved so that foaming occurs.

The platinum group metal-containing catalyst can be any such catalyst which is known to catalyze the reaction of silicon-bonded hydrogen atoms with silicon-bonded vinyl groups. By platinum group metal, it is meant ruthenium, rhodium, palladium, osmium, iridium, and platinum. Preferred is when the metal is platinum. Examples of such platinum catalysts include chloroplatinic acid, alcohol solutions of chloroplatinic acid, complexes of chloroplatinic acid with olefins, complexes of chloroplatinic acid with divinylsiloxane, platinum black, metallic platinum, and catalysts in which metallic platinum is supported on a support. The amount of component (D) that is added varies according to the type of catalyst that is used, and is not especially restricted; ordinarily, however, the amount added is 1 to 1,000 parts by weight, preferably 5 to 100 parts by weight platinum group metal, per 1,000,000 parts by weight of component (A).

When the organosiloxane polymer is a vinyldimethylsiloxane-containing gum, it is referred that the curing component be selected from the organic peroxide curing agents. When the organosiloxane polymer is a vinyldimethylsiloxane-containing liquid with viscosity of less than 150,000 mPa·s, it is preferred that the curing component comprise an organohydrogensiloxane crosslinker and a platinum group metal-containing catalyst.

Optional smoke reducing agents may be added to the ingredients in the composition of the present invention. These smoke reducing agents may be selected from materials frequently used in the silicone rubber industry to reduce smoke, including platinum, aluminum trihydrate and magnesium oxide. These materials may help in allowing the silicone to pass smoke generation criteria. As shown below in the examples, aluminum trihydrate can have the effect of increasing heat release of the polymer on burning. Therefore, aluminum trihydrate should be used only after experimentation to confirm that the increased heat release is acceptable for the amount of smoke reduction achieved. On the other hand, use of platinum in the present composition does not have an adverse impact on heat release, and can be used at levels normally used for smoke reduction.

The ingredients may optionally include smoke reduction agents, colorants, pigments or other fillers known in the art, including but not limited to diatomaceous earth, calcium carbonate titanium dioxide and mica. Preferred among these fillers is diatomaceous earth. Diatomaceous earth is a common extending filler in silicone rubber. When diatomaceous earth is used, it is preferable to add diatomaceous earth as a filler in an amount from 10 to 60 weight percent, based on the total formulation. Diatomaceous earth in combination with wollastonite changes the physical properties such as tensile and elongation of the cured composition.

The compositions of the present invention may be formulated to pass the UL 910 test for use as plenum cable materials. The UL 910 test is conducted in apparatus which is known as the Steiner Tunnel. In the UL 910 test, strands of cable are laid side, by side, in a 0.5 m by 7.6 m tray in the tunnel with an air draft of 1.22 m/s. The cables are ignited at one end with 87.9 kW/m$^2$ methane flame. Flame spread, or the distance to flame travels down the cables, is measured after 20 minutes. To pass the test, the flame spread distance must be less than 1.5 m past the gas flame end. The methane flame is 1.4 m long, and thus there can be a total of 2.9 ft. of cable burnt out of the 7.3 m. The peak optical smoke density must be less than 0.5 and the average value must be less than 0.15. Smoke optical density is measured in the exhaust duct. Cables must pass the test in two successive runs in order to be plenum rated.

The UL 910 test is expensive to run. It requires large amounts of cable and coating material. In addition it requires a specialized testing facility to accommodate the dimensions of the test environment. This makes it difficult to test multiple samples. It is understood in the field of fire research that the heat release rate of a product is the most important property predicting hazard in a fire situation, because it controls the intensity of a fire. It has also now been established that fire test results from the cone calorimeter correlate with those from full-scale fires. See, for example, Marcelo M. Hirschler, "Comparison of Large-and Small-scale Heat Release Tests with Electrical Cables," *Fire and Materials*, Vol. 18, 61–87 (1994). These efforts suggest that a cone calorimeter instrument which measures heat release rate, run with a heat flux of 88 kilowatts, is a test that is useful for screening materials for their suitability in plenum cable coating.

In addition to heat release rates, the formation of char structure is believed to be important to a material passing the UL 910 test. When a typical silicone rubber burns the char structure is quite fragile and flaky. Thus if a cable is covered with a typical silicone the char may flake away or crack during burning, exposing new polymer surfaces for pyrolysis as well as the cable core material. If the char structure remains hard, there is a possibility that flame spread will be decreased.

Char can be evaluated visually by the amount of cracking, noting whether the cracks extend vertically through the sample, by vertical expansion, by color change, and by the amount of unburned material visible. Measurements taken can include weight loss, chemical composition, or height of expansion.

Finally, smoke evolution is an important component to the passing of the UL 910 test. As discussed above, to pass the Steiner tunnel test, the peak optical smoke density must be less than 0.5 and the average value must be less than 0.15. Smoke evolution in silicone rubber is typically controlled by the addition smoke packages containing compounds such as platinum compounds, aluminum oxide, or magnesium oxide.

EXAMPLES

Test Methods

In the following examples, heat release rates were determined by a cone calorimeter. In the cone calorimeter, a conical electrical burner is positioned above the sample to emit a defined heat flux towards the sample. A spark igniter is situated above the sample's surface is used to ignite the volatile gasses being distilled from the sample. When the volatiles ignite, the time until ignition is recorded and the spark igniter is turned off. The oxygen concentration as a function of time is measured to determine the heat release rate. This is based on the principle that, for most plastics, a constant amount of heat is released per unit mass of oxygen consumed in combustion. This calorimeter is an oxygen consumption calorimeter, ASTM E1354. Given that the oxygen concentrations are far more easily determined than the heat output over time, the oxygen depletion calorimeter provides an easy way to determine the heat release rate of materials.

The dimensions of the samples were 0.10 m×0.10 m×6.3 mm and tested in a horizontal configuration with a metal frame, which is described in the ASTM, to prohibit the samples from curling upward. Two heat fluxes of 50 and 88 kW/m$^2$ were used and specified in each example. Heat release rate, HRR, which determines the size of a fire is calculated from oxygen consumption data and differentiates how much heat is evolved from a the surface area of the sample per unit time.

Samples tested on cables were coated onto copper wire as insulators. A twisted pair of insulated wires was then coated with a jacket with the same sample to give a thickness of 0.457 mm. The coating weight of the material was approximately 1600 grams per linear meter of cable.

Example 1

Elastomer samples were compounded to demonstrate the effect of wollastonite on fire performance of a model silicone elastomer network, compared to fire performance of silicone elastomers with various fillers. Samples were made using filler selected from diatomaceous earth, calcium carbonate, aluminum oxide, fumed silica and wollastonite. The amount of filler in each sample was 10 volume percent. Volume percent is used to assure that the same volume of silicone rubber fuel is available for each test sample.

The model elastomer network consisted of a dimethylvinylsiloxy-terminated dimethyl siloxane, with a average degree of polymerization (dp) of 434 which was hydrosilated with a trimethyl endcapped polymethylhydrogensiloxane with an average dp of 65, using a platinum catalyst. The ratio of SiH to Si-vinyl was held constant at 1.5:1.0 and the amount of Pt was 3 ppm. Samples were made using a Vacuum Power Mixer Plus from Whip Mix® Corporation, Louisville, Kentucky, and cured at 170° C. for 15 min. Samples were then tested in the cone calorimeter at a heat flux of 50 kW/m$^2$. The Heat Release Rate (HRR)data as a function of time can be seen in FIG. 1.

Figure 1:
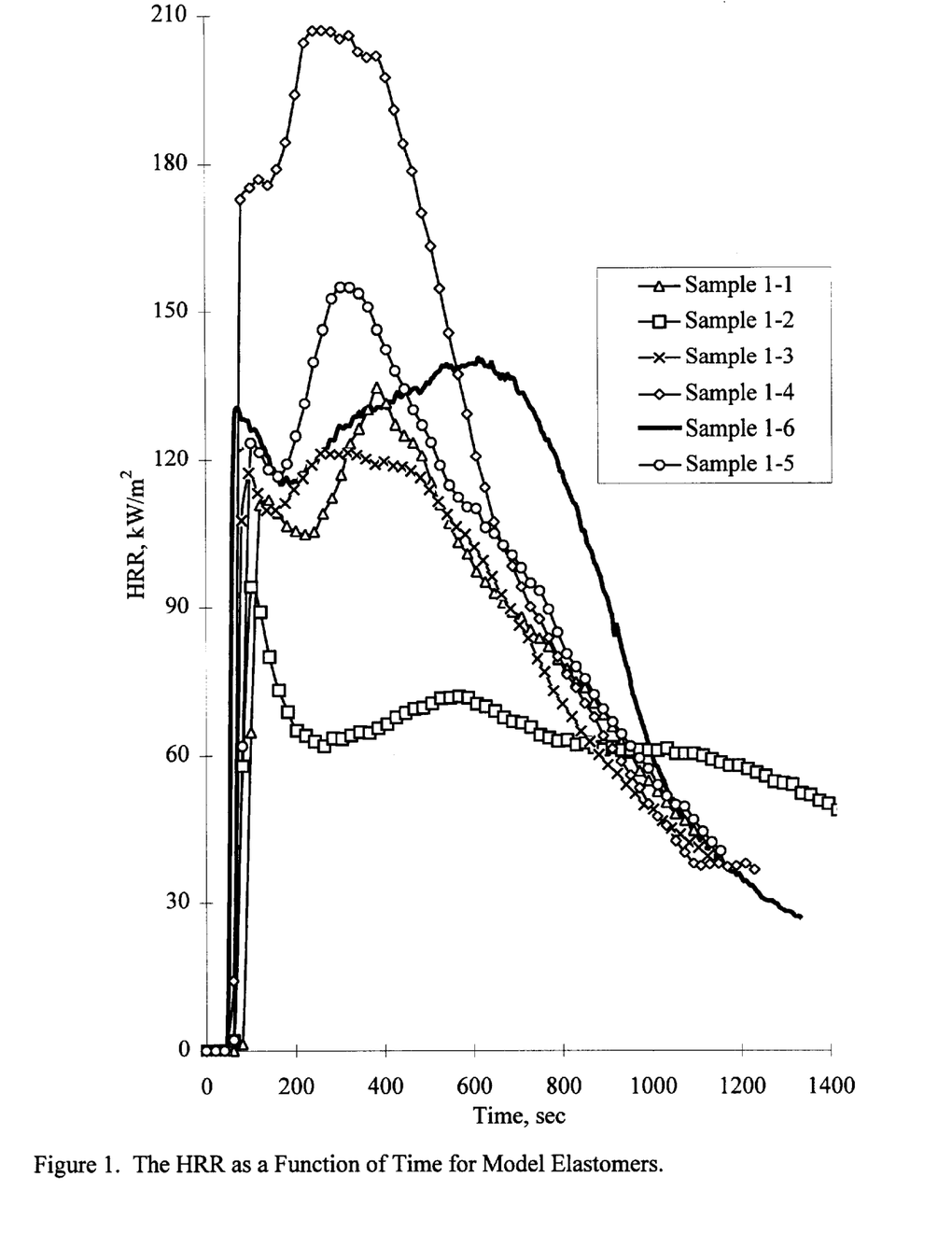
FIG. 1 shows the heat release data (HRR) as a function of time for five liquid silicone rubber samples that were cured into test slabs and burned in a cone calorimeter at 50 kW/m$^2$. Each of the silicone samples each was formulated using a different inorganic filler at 10 volume percent, based on the sample. Sample 1-1 was formulated with diatomaceous earth. Sample 1-2 was formulated with wollastonite. Sample 1-3 was formulated with calcium carbonate. Sample 1-4 was formulated with aluminum oxide. Sample 1-5 was formulated with fumed silica. Sample 1-6 was compounded without filler for comparison against the filled samples.

A control sample, labeled Sample 1-6, of the model elastomer network was compounded without filler for comparison against the filled samples. The diatomaceous earth, calcium carbonate and silica-filled samples did not have significant improvements in HRR, char structure or weight loss after burning over the control. The sample filled with aluminum oxide had a significantly higher HRR than the control sample and extremely high weight loss after burning which can be seen in Table 1. The wollastonite-filled silicone elastomer had an extremely low HRR profile. The material did not foam and vertically expand like the other samples, and the weight loss was very low, at 20 weight percent. This showed that the silicone was not consumed as quickly in a fire with wollastonite filler as with either the control or the other filled samples.

TABLE 1

Comparison of weight loss after burning

| Sample | Filler | Density, g/cm³ | Average Particle Size, μm | Weight Loss after Burning, wt. % |
|---|---|---|---|---|
| 1-1 | Diatomaceous earth (5 micron) | 2.65 | 2.65 | 30 |
| 1-2 | Wollastonite | 2.9 | 12 | 20 |
| 1-3 | Calcium Carbonate | 2.6 | 0.075 | 28 |
| 1-4 | Aluminum Oxide | 3.2 | 0.013 | 49 |
| 1-5 | Fumed Silica MS 75D | 2.04 | * | 34 |

*Surface Area 250 m²/g

Example 2

Two liquid silicone rubbers, were formulated for plenum cable coatings. Sample 2-1 contained wollastonite. Sample 2-2 contained diatomaceous earth. Both samples contained the following: 18.7 wt. % dimethyl siloxane, dimethylvinylsiloxy terminated with a degree of polymerization. of 830; 8.8 wt. % dimethyl siloxane, dimethylvinylsiloxy terminated with a degree of polymerization of 434; 16.2 wt. % dimethylvinylated and trimethylated silica; 0.7 wt. % dimethyl, methylvinylsiloxane, hydroxy terminated with an average degree of polymerization of 8; 3.3 wt. % hexamethyldisilazane; 0.2 wt. % water; 9.4 wt. % fumed silica with a surface area of 250 m²/g; 1.9 wt. % cerium hydrate; 2.3 wt. % trimethylsiloxy terminated dimethyl, methylhydrogensiloxane, with an average degree of polymerization of 8; 0.06 wt. % 2-methyl-3-butyn-2-ol; 0.1 wt. % platinum complexes; and 38.7 wt. % of a second inorganic filler, either wollastonite or diatomaceous earth. The above were mixed together in a Baker Perkins mixer. The materials were cured at 150° C. for 20 minutes and post cured for 4 hours at about 200° C. Each material was tested in the cone calorimeter at a heat flux of 88 kW/m², and the HRR data can be seen in FIG. 2.

Figure 2:
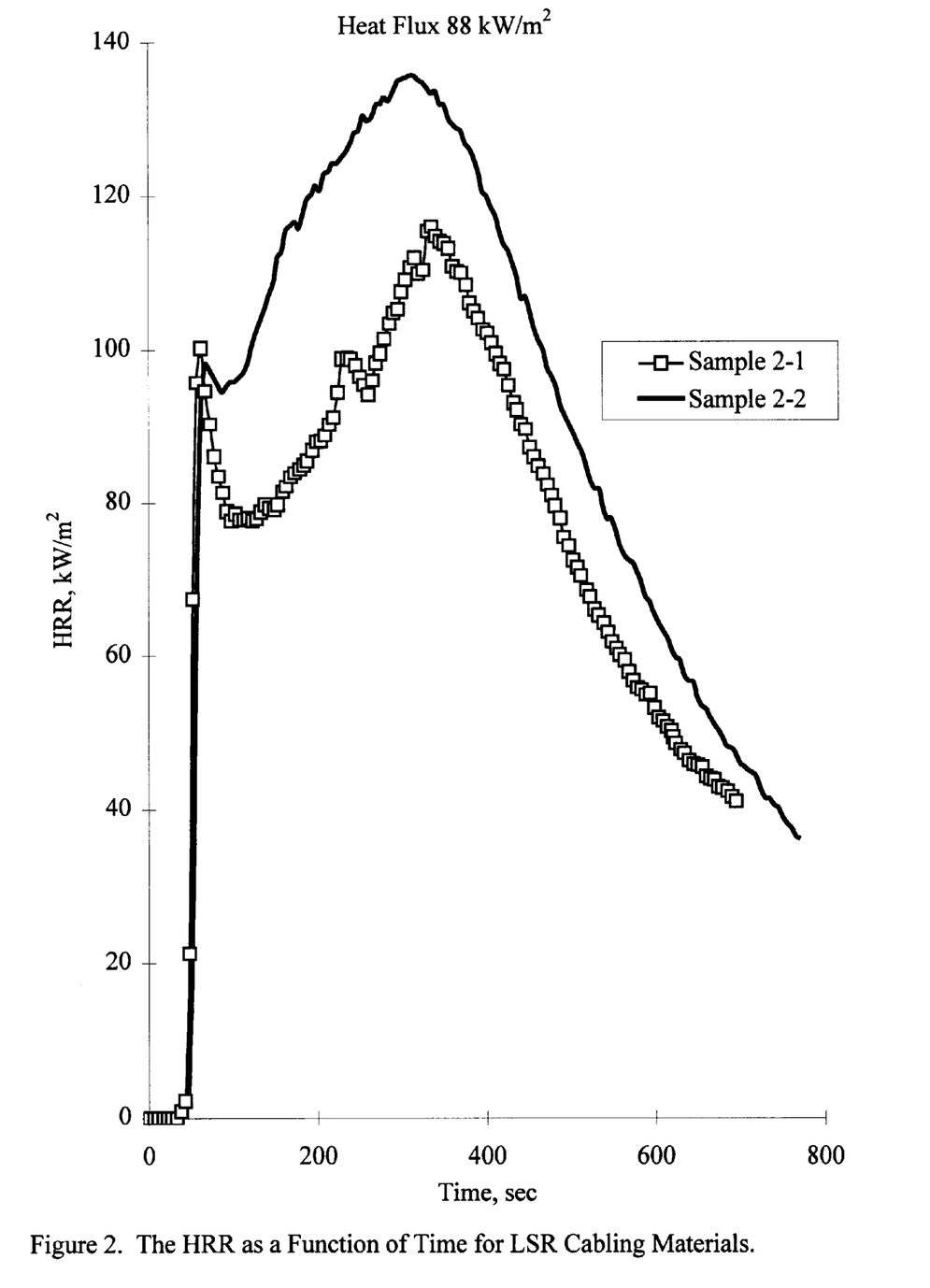
FIG. 2 shows the heat release data (HRR) as a function of time for two liquid silicone rubber samples that were cured into test slabs and burned in a cone calorimeter at 88 kW/m$^2$. Each of the silicone samples was formulated with 38.7% of inorganic filler. The inorganic filler of Sample 2-1 was wollastonite. The inorganic filler of Sample 2-2 was diatomaceous earth.

Sample 2-1, filled with wollastonite, had a lower HRR than Sample 2-2 which was filled with diatomaceous earth. Also there was a significant difference in the char structures; the diatomaceous earth-filled sample had a frangible flaky surface that was permeated with deep cracks, while the wollastonite filled sample had a tough resinous char with few surface cracks. The surface integrity of Sample 2-1 was far superior to Sample 2-2.

Example 3

High consistency rubbers were formulated for plenum cable coatings. Sample 3-1 consisted of the traditional formulation which contains diatomaceous earth as a second inorganic filler in addition to amorphous silica. Sample 3-2 contained wollastonite in place of the diatomaceous earth. Sample 3-3 contained a 50/50 blend of diatomaceous earth and wollastonite in place of the diatomaceous earth. All samples contained the following: 16.8 wt. % Base 1; 16.8 wt. % Base 2; 1.0 wt. % platinum complexes; 1.0 wt. % 2,4 dichlorobenzoyl peroxide; 0.6 wt. % Base 3; and 60.0 wt. % of second inorganic filler.

Base 1 contained 51wt. wt. % dimethylvinylsiloxy-terminated dimethyl, methylvinyl siloxane; 19wt. % amorphous silica with a surface area of 250 m²/g; 22 wt. % hydroxy-terminated dimethyl siloxane; and 3 wt. % hydroxy-terminated phenylmethyl siloxane. Base 1 had a plasticity of 1.8 to 1.9 mm.

Base 2 contained 20 wt. % silica with a surface area of 250 m²/g, treated with vinyltrimethoxysilane and phenyltrimethoxysilane; 11 wt. % dimethylvinylsiloxy-terminated dimethyl, methylvinyl siloxane; 61 wt. % dimethylvinylsiloxy-terminated dimethyl siloxane; and 4 wt. % hydroxy-terminated dimethyl siloxane. Base 2 had a plasticity of 1.4 to 1.5 mm.

Base 3 contained 6 wt. % alpha-hydroxy-, omega-methoxy- terminated dimethyl, methylvinyl siloxane; 25 wt. % amorphous silica with a surface area of 250 m²/g; 19 wt. % hydroxy-terminated dimethyl, methylvinyl siloxane; 48 wt. % dimethylvinylsiloxy terminated dimethyl siloxane and 2.5 wt. % of various cyclosiloxanes.

All materials were mixed together in a Baker Perkins mixer and cured in a hot press at 150° C. for 20 minutes. The samples were post cured for 4 hours at 200° C. Each sample was tested in the cone calorimeter at a heat flux of 88 kW/m² and the HRR data as a function of time can be seen in FIG. 3.

Figure 3:
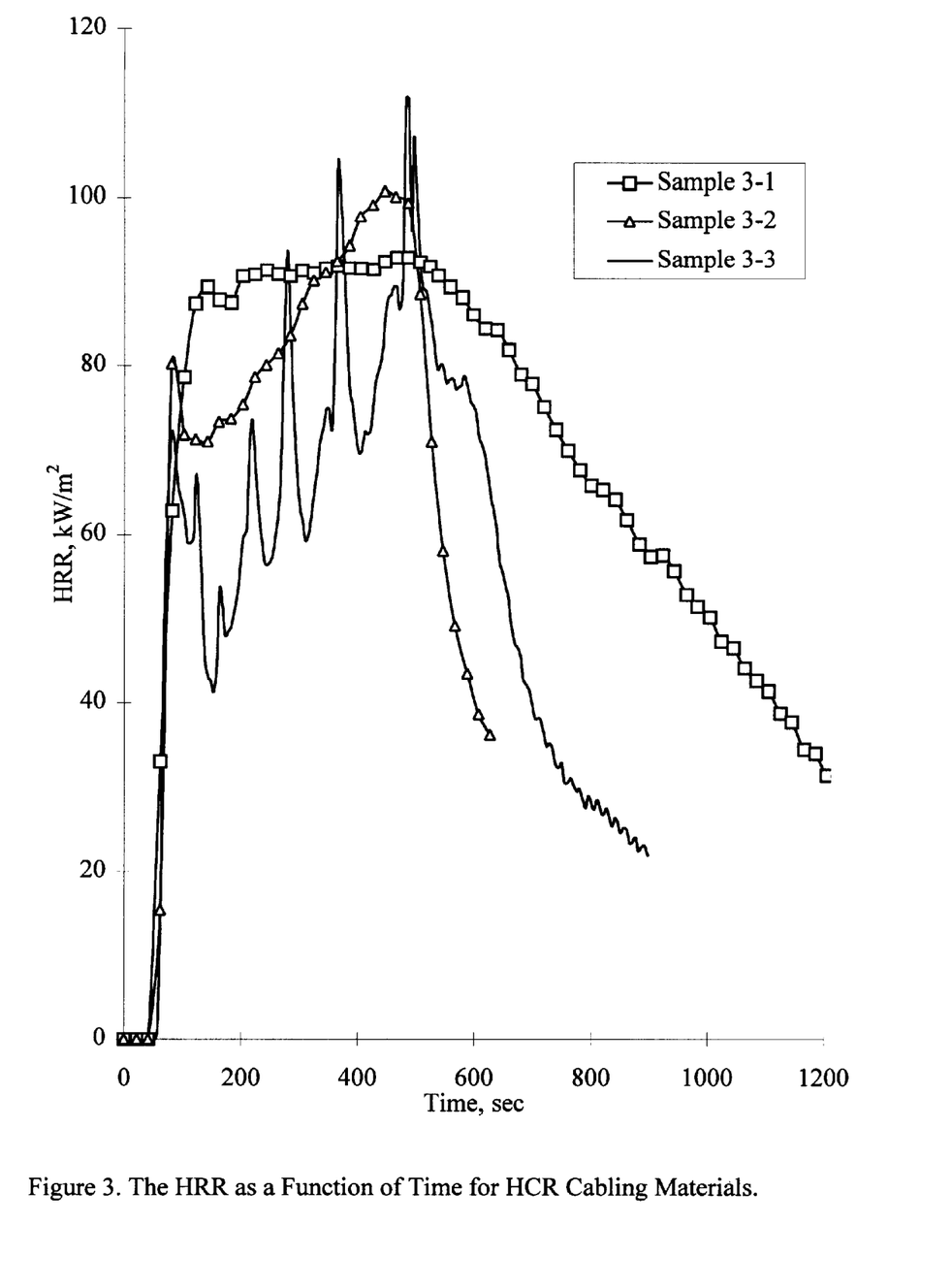
FIG. 3 shows the heat release data (HRR) as a function of time for three high consistency silicone rubber samples that were cured into test slabs and burned in a cone calorimeter at 88 kW/m$^2$. Each of the silicone samples was formulated with about 8.0 weight percent amorphous silica and 60.0 weight percent of a second inorganic filler. In Sample 3-1 the second inorganic filler was diatomaceous earth. In Sample 3-2 the second inorganic filler was wollastonite. In Sample 3-3 the second inorganic filler was a blend consisting of 50 weight percent diatomaceous earth and 50 weight percent wollastonite.

Sample 3-2, the wollastonite-filled sample, had a lower total heat released than Sample 3-1, the diatomaceous earth-filled sample. Also in Sample 3-2, the char structure was hard and resinous with no vertical expansion, the weight loss was only 6 wt. % and the fire did not penetrate through the ¼ thick sample. Sample 3-1 had a flaky char that vertically expanded, cracked and had a weight loss of 12 wt. %. Thus there were significant improvements in the wollastonite filled sample compared to the diatomaceous earth-filled sample. The large peaks in Sample 3-3's HRR profile are from the self extinguishing phenomena. The cone calorimeter measures oxygen consumption, and if a sample self extinguishes and then re-ignites, there is a large change in the oxygen consumption which is seen in the HRR profile as peaks. Thus the 50/50 blend of the two fillers proved to be an improvement in fire performance since the material was now self extinguishing under this high heat flux. Also the char was similar to Sample 3-2 and the weight loss was only 8 wt. %.

Example 4

High consistency rubbers were again formulated for plenum cable coatings with different sizes of wollastonite. Sample 4-1 below has a wollastonite with an average particle size of 12 μm and a particle size range of 1–393 μm. Sample 4-2 has a wollastonite with an average particle size of 10 μm, and a particle size range of 1–119 μm. The formulations are identical to those in Example 3, except Base 1 and Base 2 have been changed to Base 4 and Base 5. Base 4 consists of 20 wt. % silica with a surface area of 250 m²/g, 33 wt. % dimethyl, methylvinyl siloxane dimethylvinylsiloxy terminated, 38 wt. % dimethyl siloxane dimethylvinylsiloxy terminated, 6 wt. % dimethyl siloxane hydroxy terminated and 1.2 wt. % cyclosiloxanes which had a plasticity of 63–67. Base 5 consists of 20 wt. % silica with a surface area of 250 m²/g, 50 wt. % dimethyl, methylvinyl siloxane dimethylvinylsiloxy terminated, 23 wt. % dimethyl siloxane hydroxy terminated, 3 wt. % phenylmethyl siloxane, hydroxy terminated and 4 wt. % cyclosiloxanes which had a plasticity of 70–73. The materials were mixed in a Baker Perkins mixer and cured in a hot press at 150° C. for 20 minutes. The samples were post cured for 4 hours at 200° C. Each sample was tested in the cone calorimeter at a heat flux of 88 kW/m² and the HRR data as a function of time can be seen in FIG. 4.

Figure 4:
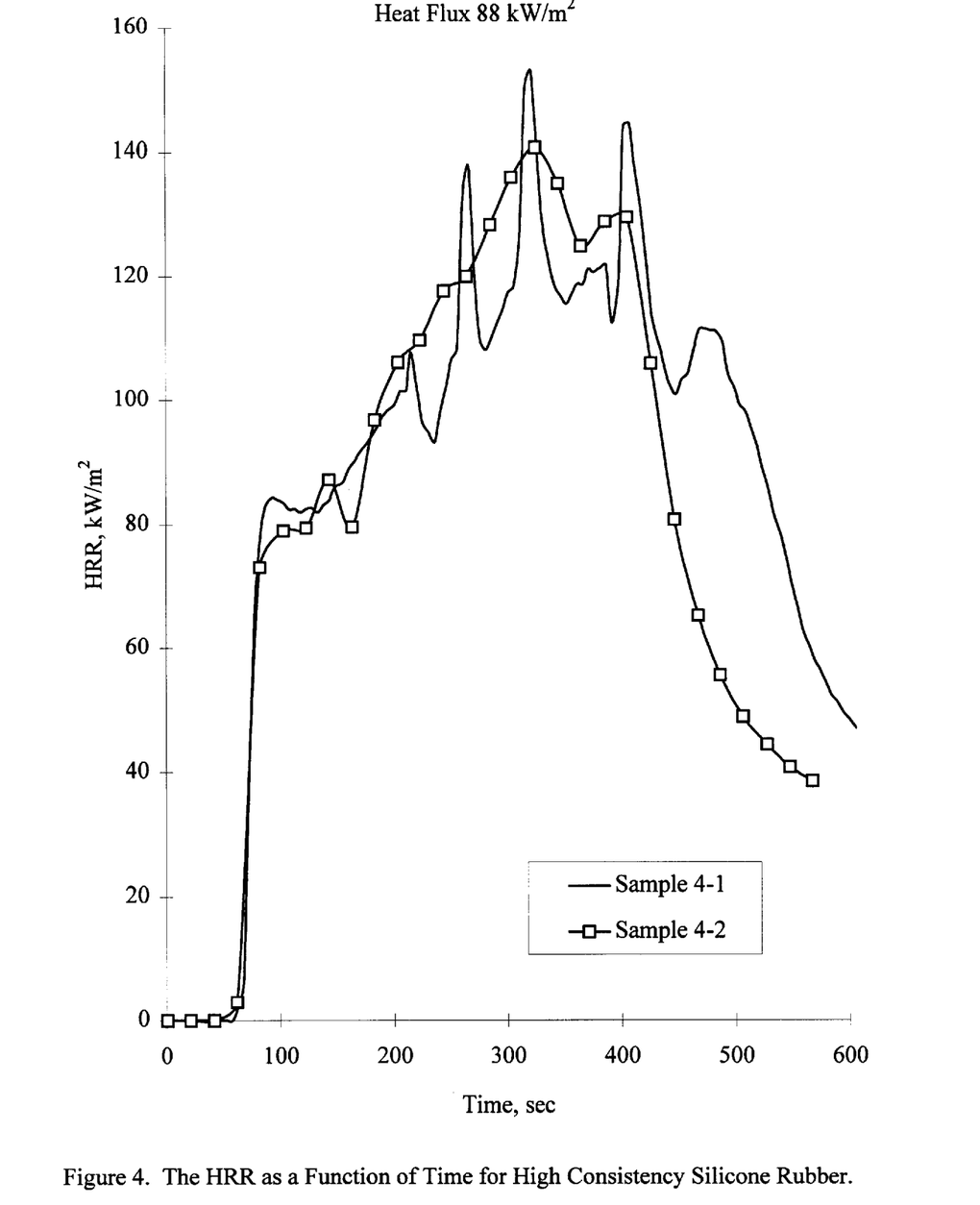
FIG. 4 shows the heat release data (HRR) as a function of time for two high consistency silicone rubber samples that were cured into test slabs and burned in a cone calorimeter at 88 kW/m$^2$. Each of the silicone samples was formulated with about 8.0 weight percent amorphous silica and 60.0 weight percent of wollastonite. In sample 4-1 the wollastonite grade had an average particle size of 12 $\mu$m and a particle size in the range of 1–393 $\mu$m, and an aspect ratio of 20:1. In sample 4-2 the wollastonite grade had an average size of 10 $\mu$m and a particle size in the range of 1–110 $\mu$m and an aspect ratio of 17:1.

The HRR of Samples 4-1 and 4-2 is very similar. There is also no significant difference in the char structures of the two materials. The difference in average particle size, about 2 μm, appears to make little difference.

Example 5

High consistency rubbers were formulated for plenum cable coatings with and without platinum complexes. Platinum is a smoke reduction agent. The formulation of the elastomer was identical to Sample 4-1 except the amount of platinum complexes was change to 0.0 wt. % in Sample 5-1 and 0.5 wt. % in Sample 5-2. Each sample was tested in the cone calorimeter at a heat flux of 50 kW/m$^2$ and the HRR data as a function of time can be seen in FIG. 5.

Figure 5:
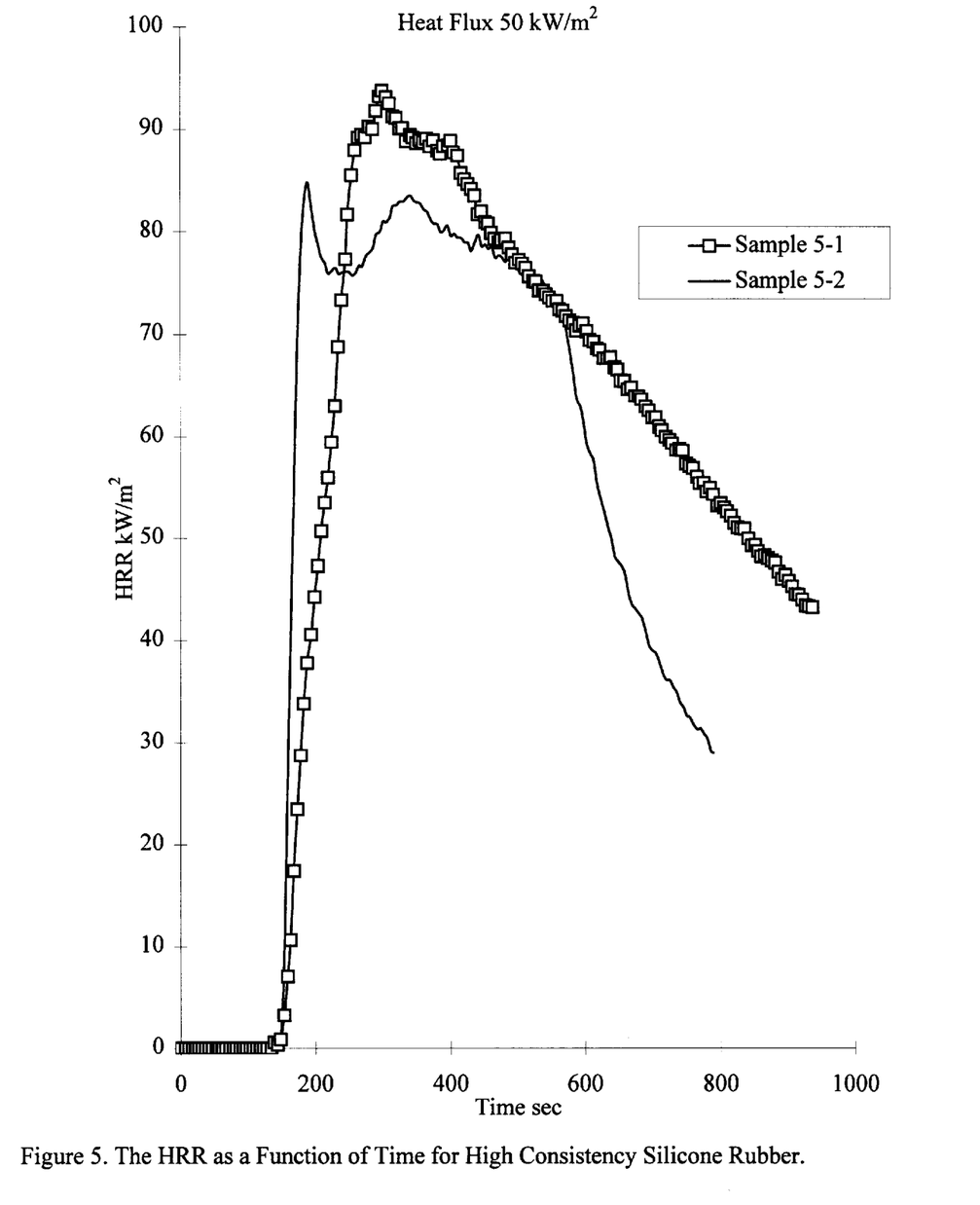
FIG. 5 shows the heat release date (HRR) as a function of time for two high consistency silicone rubber samples that were cured into test slabs and burned in a cone calorimeter at 50 kW/m$^2$. Sample 5-1 contained no platinum complex as smoke reduction agent. Sample 5-2 contained 0.5 weight percent of a platinum complex.

The HRR of Samples 5-1 and 5-2 is very similar. There is also no significant difference in the char structures of the two materials. Thus the absence of platinum complexes has little significant effect on the fire performance of the elastomer.

Example 6

Elastomer samples were compounded to demonstrate the effect of wollastonite which is mined calcium silicate compared to a synthetic calcium silicate, Celite C from World Minerals Inc., Lompoc, Calif. with a B.E.T. surface area of 175 m$^2$/g, on the fire performance of a model silicone elastomer network. The amount of filler in each sample was 10 volume percent. Volume percent is used to assure that the same volume of silicone rubber fuel is available for each test sample.

Figure 6:
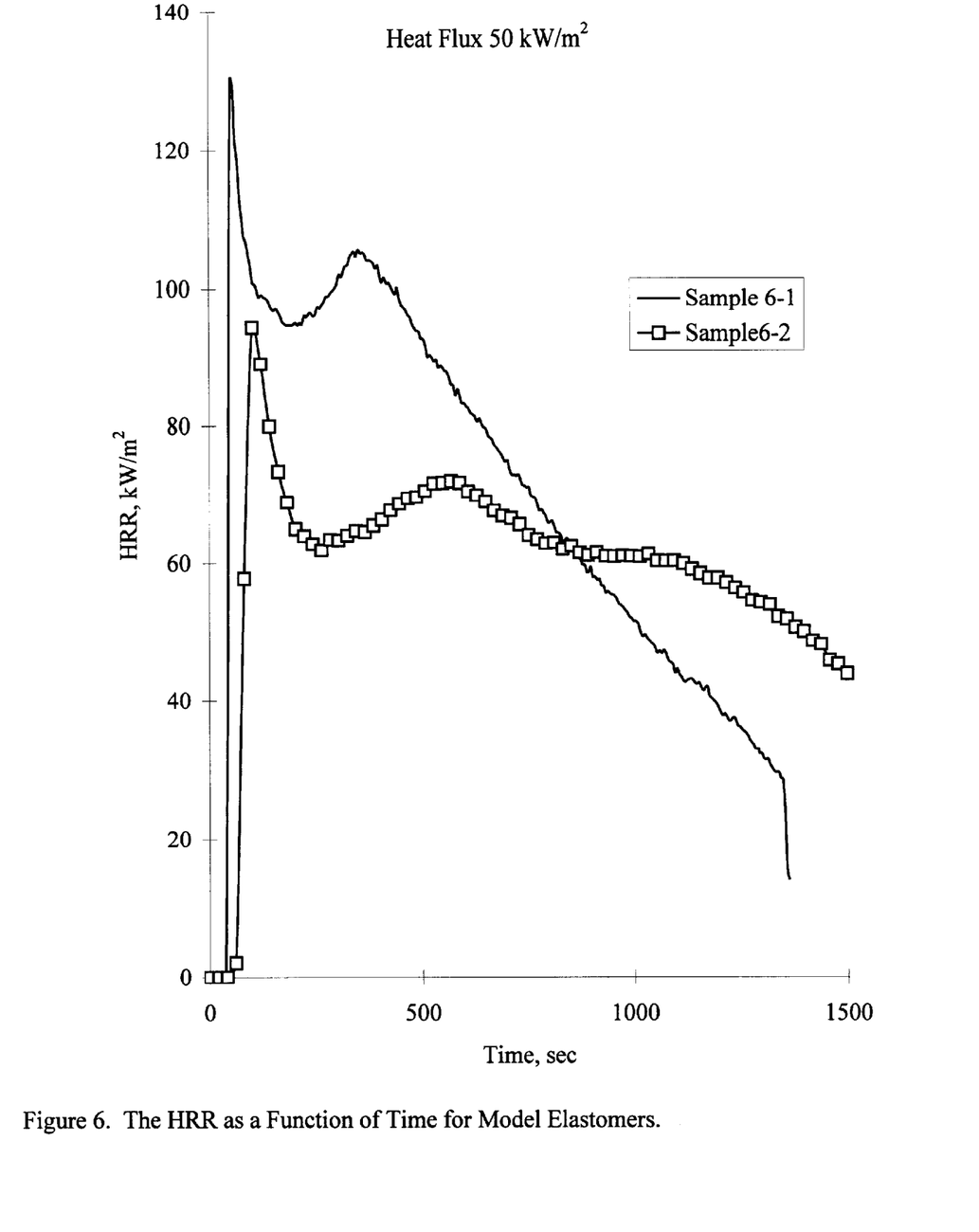
FIG. 6 shows the heat release rate (HRR) as a function of time for two liquid silicone rubber samples that were cured into test slabs and burned in a cone calorimeter at 50 kW/m$^2$. Each of the samples was formulated with about 10 volume percent inorganic filler. Sample 6-1 was formulated with synthetic calcium silicate. Sample 6-2 was formulated with wollastonite.

The model elastomer network consisted of a dimethylvinylsiloxy-terminated dimethyl siloxane, with a average degree of polymerization (dp) of 434 which was hydrosilated with a trimethyl endcapped polymethylhydrogensiloxane with an average dp of 65, using a platinum catalyst. The ratio of SiH to Si-vinyl was held constant at 1.5:1.0 and the amount of Pt was 3 ppm. Samples were made using a Vacuum Power Mixer Plus from Whip Mix® Corporation, Louisville, Ky., and cured at 170° C. for 15 min. Samples were then tested in the cone calorimeter at a heat flux of 50 kW/m$^2$. The Heat Release Rate (HRR) data as a function of time can be seen in FIG. 6. Sample 6-1 contains a synthetic calcium silicate while Sample 6-2 contains wollastonite. Sample 6-2 has a higher heat release rate and a higher weight loss of 28% compared to 20%. The char structure of Sample 6-1 is also quite friable. Thus wollastonite or mined calcium silicate must be used to enhance the fire performance of the elastomer.

Example 7

High consistency rubbers were formulated for plenum cable coatings. Sample 7-1 consisted of the traditional formulation which contains diatomaceous earth as the second inorganic filler and aluminum trihydrate and magnesium oxide as a smoke reduction package where Sample 7-2 contained wollastonite as the second inorganic filler. Sample 7-1 contained the following: 17.0 wt. % Base 4; 17.0 wt. % Base 5; 0.1 wt. % platinum complexes; 1.0 wt. % 2,4 dichlorobenzoyl peroxide; 0.6 wt. % Base 3; 7.0 wt % aluminum trihydroxide; 3.5 wt % magnesium oxide; and 53.8 wt. % diatomaceous earth. Sample 7-2 contained the following: 18.9 wt. % Base 4; 18.9 wt. % Base 5; 0.1 wt. % platinum complexes; 1.0 wt. % 2,4 dichlorobenzoyl peroxide; 0.6 wt. % Base 3; and 60.5 wt % wollastonite. These materials were coated onto 24 gage bare copper wire. A pair of lead wires were twisted together and more material was coated to jacket the wire. The weight of silicone coating material on the cable was about 1600 grams per lineal meter. These test cables were tested in the UL 910 tunnel. 7-1 failed the tunnel while 7-2 passed the UL 910 test requirements for smoke and flame spread.

I claim:
1. A curable silicone composition comprising:
    (A) 30 to 90 weight percent of a heat-curable organosiloxane polymer, containing at least 2 alkenyl groups per molecule,
    (B) 1 to 65 weight percent of a reinforcing silica filler, based on the total composition,
    (C) 5 to 70 weight percent wollastonite having an average particle size of 2 to 30 µm, based on the total composition, and
    (D) curing component sufficient to cure the composition, wherein the composition, after curing has a peak heat release of less than 100 kW/m$^2$ when tested at a heat flux of about 50 kW/m$^2$.
2. The composition of claim 1 wherein the composition also has a peak heat release of less than 120 kW/m$^2$ when tested at a heat flux of about 88 kW/m$^2$.
3. The composition of claim 1 where component (A) is a vinyl-containing polydimethylsiloxane.
4. The composition of claim 1 wherein component (A) has a degree of polymerization of at about 200 to 20,000.
5. The composition of claim 1 wherein component (C) comprises 5 to 25 weight percent wollastonite.
6. The composition of claim 1 wherein component (C) has an aspect ratio (length-to-diameter) of from about 15 to 1 to 20 to 1.
7. The composition of claim 1 wherein component (C) has an average particle size of about 10 to 15 µm.
8. The composition of claim 1 wherein component (D) is a peroxide catalyst.
9. The composition of claim 7 wherein component (D) is selected from the group consisting of 2,5-dimethyl-2,5-di(tert-butylperoxy)hexane, 2,2-bis(t-butylperoxy)-p-diisopropylbenzene, 1,1,bis(t-butylperoxy)-3,3,5-trimethylcyclohexane, 2,5-dimethyl-2,5-di(tert-butylperoxy)hexyne- 3,di-t-butylperoxide, benzoyl peroxide, p-chlorobenzoyl peroxide, dicumyl peroxide, tertiary butyl peracetate, tertiary butyl perbenzoate, monochlorobenzoyl peroxide, 2,4-dichlorobenzoyl peroxide, and tertiary butyl cumyl peroxide.
10. The composition of claim 1 wherein component (D) consists of a organohydrogensiloxane crosslinker, and a platinum group metal catalyst.
11. The composition of claim 10 wherein the polymer is a polydimethylsiloxane having a viscosity of less than about 150,000 mPa·s.
12. The composition of claim 1 wherein the ingredients further comprise an effective amount of a smoke reduction agent.
13. The composition of claim 12 wherein the smoke reduction agent is a platinum compound.
14. The composition of claim 1 wherein the ingredients further comprise an additional filler selected from the group consisting of diatomaceous earth, calcium carbonate titanium dioxide and mica.
15. The composition of claim 14 wherein the additional filler comprises 10 to 60 weight percent diatomaceous earth, based on the total formulation.
16. A transmission media cable comprising a cured silicone rubber coating formed by curing a composition formed by mixing and curing ingredients comprising:
    (A) 30 to 90 weight percent of a heat-curable non-halogenated polydimethylsiloxane polymer, containing at least 2 alkenyl groups per molecule,
    (B) 5 to 25 weight percent reinforcing silica,
    (C) 5 to 70 weight percent wollastonite having an average aspect ratio (length-to-diameter) of at least 3 to 1, and having an average particle size of 2 to 25 µm, and

(D) curing component sufficient to cure the composition, such that the composition, after curing has a peak heat release of less than 100 kW/m$^2$ when tested at a heat flux of about 50 kW/m$^2$.

17. The transmission media cable of claim 16 wherein the silicone composition is coated at a jacket thickness of about 0.2 to 0.6 mm and is capable of passing the UL 910 flammability test.

18. The transmission media cable of claim 16 wherein the cured silicone rubber coating comprises greater than 50 percent wollastonite, by weight.

* * * * *